US012621318B2

(12) United States Patent (10) Patent No.: US 12,621,318 B2
Gehrer et al. (45) Date of Patent: May 5, 2026

(54) SYSTEM FOR INTRUSION DETECTION USING A VEHICLE ELECTRICAL SYSTEM

(71) Applicant: Robert Bosch GmbH, Stuttgart (DE)

(72) Inventors: Stefan Gehrer, Pittsburgh, PA (US); Jorge Guajardo Merchan, Pittsburgh, PA (US)

(73) Assignee: Robert Bosch GmbH (DE)

( * ) Notice: Subject to any disclaimer, the term of this patent is extended or adjusted under 35 U.S.C. 154(b) by 26 days.

(21) Appl. No.: 18/897,999

(22) Filed: Sep. 26, 2024

(65) Prior Publication Data

US 2026/0089174 A1 Mar. 26, 2026

(51) Int. Cl.
*H04L 9/40* (2022.01)
(52) U.S. Cl.
CPC ...... *H04L 63/1416* (2013.01); *H04L 63/1425* (2013.01); *H04L 63/1441* (2013.01)
(58) Field of Classification Search
CPC ............. H04L 63/1416; H04L 63/1425; H04L 63/1441
See application file for complete search history.

(56) References Cited

U.S. PATENT DOCUMENTS

| | | |
|---|---|---|
| 11,095,147 B2 | 8/2021 | Eriksson |
| 11,683,341 B2 | 6/2023 | Guajardo Merchan et al. |
| 2011/0320109 A1 | 12/2011 | Polimeno et al. |
| 2016/0366170 A1 | 12/2016 | Bell |
| 2017/0286675 A1 * | 10/2017 | Shin .................... H04L 63/1416 |
| 2019/0332823 A1 * | 10/2019 | Kwon .................... G06F 21/554 |
| 2021/0055926 A1 | 2/2021 | Fox |
| 2021/0176259 A1 * | 6/2021 | Park .................... H04L 63/1408 |
| 2021/0194921 A1 * | 6/2021 | Guajardo Merchan ... G06F 8/65 |

(Continued)

FOREIGN PATENT DOCUMENTS

| | | | | |
|---|---|---|---|---|
| EP | 4092553 A1 * | 11/2022 | ......... | H04L 63/1425 |

OTHER PUBLICATIONS

Armin Köhler et al., "An Approach of Fail Operational Power Supply for Next Generation Vehicle Powernet Architectures." Proceedings of the 30th European Safety and Reliability Conference and the 15th Probabilistic Safety Assessment and Management Conference 2020, pp. 60-67.

(Continued)

*Primary Examiner* — Hee Soo Kim
(74) *Attorney, Agent, or Firm* — Dickinson Wright PLLC

(57) ABSTRACT

A system includes a processor is programmed to define a fingerprint that includes a baseline measurement of a physical attribute of the system prior to runtime operation, wherein the system includes at least one set of non-safety critical consumer channels, one set of safety critical consumer channels, and two different power sources connected to two power channels, a first power source supplies power to the one set of non-safety critical consumer channels and a second power source supplies power to the one set of safety critical consumer-channels, two switches separate the consumer channels and can individually shut off the consumer channels, wherein the processor is further programmed to receive a runtime measurement of the physical attribute of the channels and compare the measurements to the fingerprint, and in response to the measurement exceeding a threshold, execute a countermeasure operation against software.

20 Claims, 4 Drawing Sheets

(56)            References Cited

U.S. PATENT DOCUMENTS

| 2022/0050130 A1 | 2/2022 | Song et al. | |
| 2023/0109507 A1* | 4/2023 | Kim ........................ | B60R 25/30 |
| | | | 726/25 |

OTHER PUBLICATIONS

International Search Report and Written Opinion for PCT/US2025/048094, Completed by the Korean Patent Office on Jan. 26, 2026, 11 Pages.

* cited by examiner

*200*

201 — Active enrollment

203 — Receive measurements

205 — Derive fingerprint

207 — Sign fingerprint

209 — Store signature

*300*

301 — Perform measurements

303 — Compare measurement to fingerprint

305 — Outside threshold?

No

Yes

307 — Log potential detection

309 — Activate countermeasure

SYSTEM FOR INTRUSION DETECTION USING A VEHICLE ELECTRICAL SYSTEM

TECHNICAL FIELD

The present disclosure relates to security of a computer system, such as a vehicle computer system or other type of system, in the context of a smart power distribution system.

BACKGROUND

From a security standpoint, modern automotive in-vehicle networks present a significant attack surface due to the numerous Electrical Control Units (ECUs) and their connectivity to external networks. To enhance vehicle safety and security, vehicles can be equipped with a feature that detects malicious intrusions in these networks. However, intrusion detection systems usually require additional sensors and only protect specific microcontrollers or subsystems, which can ultimately increase the impact of attacks on the vehicle networks.

SUMMARY

According to one embodiment, a system includes memory and a processor in communication with the memory. The processor is programmed to: define a fingerprint that includes a baseline measurement of a physical attribute of a smart power distribution system during an evaluation period of the system; receive a runtime measurement of the physical attribute of the at least one set of safety critical consumer channels of the smart power distribution system during runtime; compare the runtime measurement of the physical attribute to the fingerprint; and in response to the measurement exceeding a threshold, execute a countermeasure operation against software ran by the smart power distribution system. The smart power distribution system includes: at least one set of non-safety critical consumer channels; at least one set of safety critical channels; at least two different power sources connected to at least two power channels, wherein a first power source supplies power to the at least one set of non-safety critical consumer channels and a second power source supplies power to the at least one set of safety critical consumer-channels; and at least two switches separating the safety critical consumer channels and the non-safety critical consumer channels, wherein the at least one set of non-safety critical consumer channels and the at least one set of safety critical consumer channels can be individually shut off by the at least two switches.

According to another embodiment, a system includes memory and a processor in communication with the memory. The processor is programmed to: define a fingerprint that includes a baseline measurement of a physical attribute of a smart power distribution system during an evaluation period of the system; receive a runtime measurement of the physical attribute of the at least one set of non-safety critical consumer channels of the smart power distribution system during runtime; compare the runtime measurement of the physical attribute to the fingerprint; and in response to the measurement exceeding a threshold, execute a countermeasure operation against software ran by the smart power distribution system. The smart power distribution system includes: at least one set of non-safety critical consumer channels; at least one set of safety critical channels; at least two different power sources connected to at least two power channels, wherein a first power source supplies power to the at least one set of non-safety critical consumer channels and a second power source supplies power to the at least one set of safety critical consumer-channels; and at least two switches separating the safety critical consumer channels and the non-safety critical consumer channels, wherein the at least one set of non-safety critical consumer channels and the at least one set of safety critical consumer channels can be individually shut off by the at least two switches.

According to a further embodiment, a system includes memory and a processor in communication with the memory. The processor is programmed to: define a fingerprint that includes a baseline measurement of a physical attribute of a smart power distribution system during an evaluation period of the system; receive a runtime measurement of the physical attribute of the at least one set of non-safety critical consumer channels and the at least one set of safety critical consumer channels of the smart power distribution system during runtime; compare the runtime measurement of the physical attribute to the fingerprint; and in response to the measurement exceeding a threshold, execute a countermeasure operation against software ran by the smart power distribution system. The smart power distribution system includes: at least one set of non-safety critical consumer channels; at least one set of safety critical channels; at least two different power sources connected to at least two power channels, wherein a first power source supplies power to the at least one set of non-safety critical consumer channels and a second power source supplies power to the at least one set of safety critical consumer-channels; and at least two switches separating the safety critical consumer channels and the non-safety critical consumer channels, wherein the at least one set of non-safety critical consumer channels and the at least one set of safety critical consumer channels can be individually shut off by the at least two switches.

DETAILED DESCRIPTION

Figure 1:
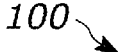
FIG. 1 illustrates a block diagram of an exemplary computing device, according to some embodiments of the disclosure.
Figure 1:
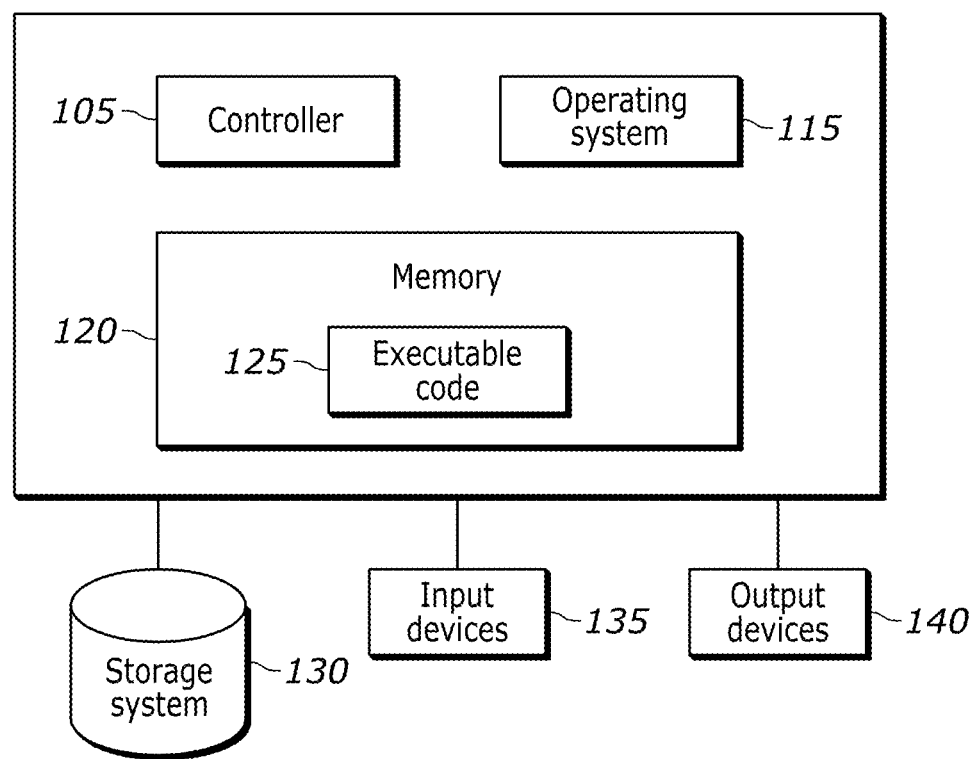

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

The illustrative embodiment introduces systems used to detect malicious attacks while utilizing a smart power distribution system. The smart power distribution system may not need any additional hardware to operate as an Intrusion Detection System (IDS) or Intrusion Detection and Prevention System (IDPS), and instead rely on the hardware already utilized at the smart power distribution system. Such a solution may offer lower cost to implement and offer other benefits from traditional systems. For example, embodiments disclosed below may have advantages as related to a fault tolerance as compared to other systems. In one embodiment, a physical property of a device or electronic control unit (ECU) connected to a smart power distribution system (SPDS) may constantly be measured by utilizing integrated components of the SPDS. The measurement may then be compared by the integrated IDS of the SPDS to a reference measurement performed during a profiling phase. Alternatively, external circuitry could be used for filtering measurements. Alternatively, the measurement could be transmitted to a gateway/network Intrusion Detection System (IDS) or Intrusion Detection and Prevention System (IDPS) residing locally in the car. The IDS or IDPS may conduct such a comparison. The IDS or IPDS may also work with other measurements or characteristics of the smart power distribution system to improve the detection for measurements. For example, additional measurements may include physical characteristics related to the smart power distribution system, etc. The transmission of an injected message or signals at the smart power distribution system would ideally have a different signature. Furthermore, remote attestation capabilities could be added, which would allow the network IDS to send challenges that trigger a sequence of functions which are fingerprinted via power/timing and these fingerprints are sent with a response that are verified.

The system may utilize existing sensors and components of the SPDS to perform a device measurement of a physical property (e.g. power, timing, sound, temperature, vibration, etc.) to perform an initial baseline measurement at the smart power distribution system. This measurement is used to derive a fingerprint using, for example, ML techniques, signal processing techniques or a combination thereof. In addition, the system may be integrated with a smart power distribution system to provide an additional safety and security feature using anomaly detection. Real time measurements of the smart power distribution system (e.g. voltage/current of the power channels, state of switches, state of battery, power distribution, component failures, temperature of components etc.) can be used as one or multiple sources for an IDS. The smart power distribution system's measurements of reliable power supply can indicate vehicle safety anomalies. When the smart power distribution system detects an anomaly in the system (e.g.

manipulated software in ECU, manipulated hardware of ECUs, removed and/or added ECUs, unusual behavior of car or consumers etc.) a countermeasure may be triggered. Thus, integrating the smart power distribution system with an IDS effectively enhances vehicle security while minimizing the need for additional electrical hardware. In one embodiment, multiple smart power distribution system measurements can be analyzed as the same time, e.g., utilizing sensor fusion, which might lead to improved detection of security and safety events. For example, measurements at a high-safety consumer device may be utilized, as well as measurements from switches that are utilized to provide (or disconnect) power from the power source channel to low-safety consumer devices.

As shown in FIG. 1, which shows a block diagram of an exemplary computing device, according to some embodiments of the disclosure. A device 100 may include a controller 105 that may be, for example, a central processing unit processor (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system, such as a real-time operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a nonvolatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein, for example, detects or prevents cyber-attacks on in-vehicle networks. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. Where applicable, the terms "process" and "executable code" may mean the same thing and may be used interchangeably herein. For example, verification, validation and/or authen-tication of a process may mean verification, validation and/or authentication of executable code.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a nonvolatile memory having the storage capacity of storage system 130. Accordingly, although shown as a separate component, storage system 130 may be embedded or included in memory 120.

Input devices 135 may be or may include any suitable input devices, components or systems, e.g., physical sensors such as accelerometers, tachometers, thermometers, microphones, analog to digital converters, etc., a detachable keyboard or keypad, a mouse and the like. Output devices 140 may include one or more (possibly detachable) displays or monitors, motors, servo motors, speakers and/or any other suitable output devices. Any applicable input/output (I/O) devices may be connected to computing device 100 as shown by blocks 135 and 140. For example, a wired or wireless network interface card (NIC), a universal serial bus (USB) device, JTAG interface, or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate, with control or other units in a vehicle, e.g., input and/or output devices or components 135 and 140 may include ports that enable device 100 to communicate with an engine control unit, a suspension control unit, a traction control and the like.

Embodiments may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components.

In some embodiments, a system may include or may be, for example, a plurality of components that include a respective plurality of central processing units, e.g., a plurality of CPUs as described, a plurality of CPUs embed-ded in an on board, or in-vehicle, system or network, a plurality of chips, FPGAs or SOCs, microprocessors, trans-ceivers, microcontrollers, a plurality of computer or network devices, any other suitable computing device, and/or any combination thereof. For example, a system as described herein may include one or more devices such as computing device 100.

Figure 2:
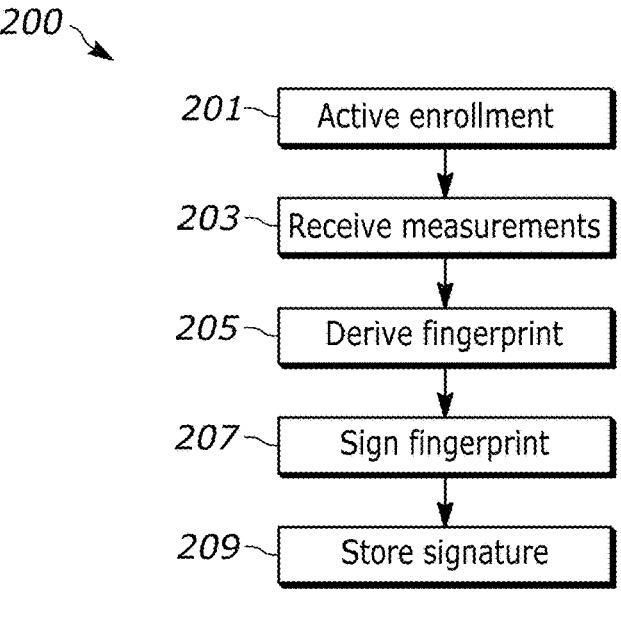
FIG. 2 illustrates a flow chart 200 of an enrollment period of the computing device.

FIG. 2 discloses a flow chart illustrating the active enrollment period for a system according to an embodiment, such as a smart power distribution system. At step 201, the system may activate in an enrollment period. At the enrollment period, the integrated IDS system in the smart power system (e.g. Powernet Guardian) may analyze various attributes to determine normalized measurements for physical attribute of the system. The enrollment period may help determine a fingerprint associated with the system. Various attributes that may be measured include power, timing, sound, temperature, vibration, radiation, etc. In another embodiment, several physical attributes may be measured from a smart power distribution system including the voltage/current of the power channels, states of switches, state of battery, power distribution, component faults, and temperature of components. The enrollment period may be activated at different stages. For example, the enrollment period may be activated by the OEM during manufacturing. It may be beneficial that the enrollment period occurs in a secure facility or secure environment where no external attackers can have access. The OEM may have developed their own software and train the fingerprinting of the software prior to deployment in the system. If the OEM control the enrollment at manufacturing, it may provide additional security because manufacturing may be in a secure environment to make sure that the software has not been tampered with.

In another embodiment, enrollment may occur during operation of the vehicle or system at specified intervals that allows the system to perform retraining. From a security point of view, this may be less secure than at secure environment because it will require to verify that the system is in a secure environment. Another way to prevent attacks would be to only do the enrollment when there is not too much difference between the current measurement and last measurement that was performed (likely the signed fingerprint). In such a scenario, this may allow fine-tuning of the fingerprint. Another embodiment would be to allow the system to perform re-enrolment during servicing a car or system at a "trusted" service center, like a dealership or an associated retail store.

At step 203, the system may receive and aggregate the measurements received at the smart power distribution system. Thus, the system may obtain measurements that are utilized to derive the fingerprint utilizing the integrated IDS of the SPDS. In one embodiment, a sensor may perform a device measurement of a physical attribute of the system, including power, timing, sound, temperature, vibration, radiation, etc. The system may take measurements for a threshold period of time at various stages of operation. The measurements may be stored in memory after each threshold period of time. The measurements may be done for each physical attribute, such as power consumption, timing, sound, temperature, vibration, radiation, etc.

At step 205, the system may derive a fingerprint associated with the system. The fingerprint may be derived from the physical attributes. The fingerprint may be a data set that includes information related to the baseline measurements of the physical attributes of the system. Thus, the fingerprint may be utilized to identify normal operation of the system. The fingerprint may include one attribute's baseline measurement, or several attributes baseline mea-surements. For example, the fingerprint may include only a baseline measurement for power consumption of the system. The fingerprint may be a set of features derived from raw measurements, which may tend to be more stable to change over time, or more stable to environmental conditions, or both. The fingerprint may be a combination of features and/or raw measurements. In another example, the fingerprint may include a baseline measurement for power consumption, timing, sound, temperature, vibration, and radiation in another example. The fingerprint may be used using various techniques, such as machine learning techniques, signal processing techniques, or a combination thereof. The fingerprint may be measured, recorded, and/or derived by an ECU associated with the IDS. The ECU may also be part of the SPDS and part of it reused for IDS functionality. Alternatively, the fingerprint may be measured, recorded, and/or derived by a microcontroller already part of the SPDS system. For example, in one embodiment the system may not need a separate ECU that could be integrated into the SPDS.

For each device (or groups of devices) that is connected to the SPDS, the devices may be turned on and off individually to be able to characterize their power fingerprint individually. The integrated IDS of the SPDS may be utilized to identify the frequency range in which a particular device (whose fingerprint is being or attempted to measure) operates. The Integrated IDS in the SPDS may record the frequency range. The IDS in the SPDS may derive the expected fingerprint by filtering out all other frequencies and then computing the associated fingerprint. Additionally, the IDS module that is integrated in the smart power distribution system may record the expected fingerprint in a secure database or sign it with a private key or MAC key (as already described in the disclosure). The secure database may be located within the integrated IDS system of the SPDS or external from it in a secure storage area.

At step 207, the system may sign the fingerprint. The fingerprint may be signed utilizing standard cryptographic schemes, such as private key/public key schemes. In some systems, the fingerprint may be protected against unauthorized changes by computing a message authentication code (MAC) on the fingerprint with a key that is shared with a verifier. This assumes that access to the key is kept secret and secured from unauthorized access. In other systems, it might be possible to measure and send the fingerprint without any additional cryptographic protection. Thus, cryptographic protection may be utilized in an option in alternative embodiments. Such an embodiment may be beneficial because the system may be performing the measurement with a different (possibly external) device likely independent of the device executing the software that needs to be fingerprinted. Thus, the system may assume that in some cases that this device used to fingerprint (measure physical signals and derive fingerprint) has also a secure connection to the IDS or the backend (or both). The signature may add additional security mechanisms to the fingerprint in order to prevent a cyber-threat. In an alternative embodiment, the fingerprint may be encoded data that is not able to be read without being decoded.

At step 209, the signature, fingerprint, and associated public key may be stored in memory. The signature and public key may be stored in different memory areas. Furthermore, the signature may be stored in read-only memory or other memory that is not writable. Both the signature and public key may also be stored in memory that is remote from the system. Alternatively, to storing the complete key, a link to the public key could be stored that may later be retrieved. In another embodiment, a hash of the public key stored in fuses may be stored, and the complete key may be stored elsewhere. In yet another embodiment, the protocol may require that the entity checking may send public key with a verification request.

Figure 3:
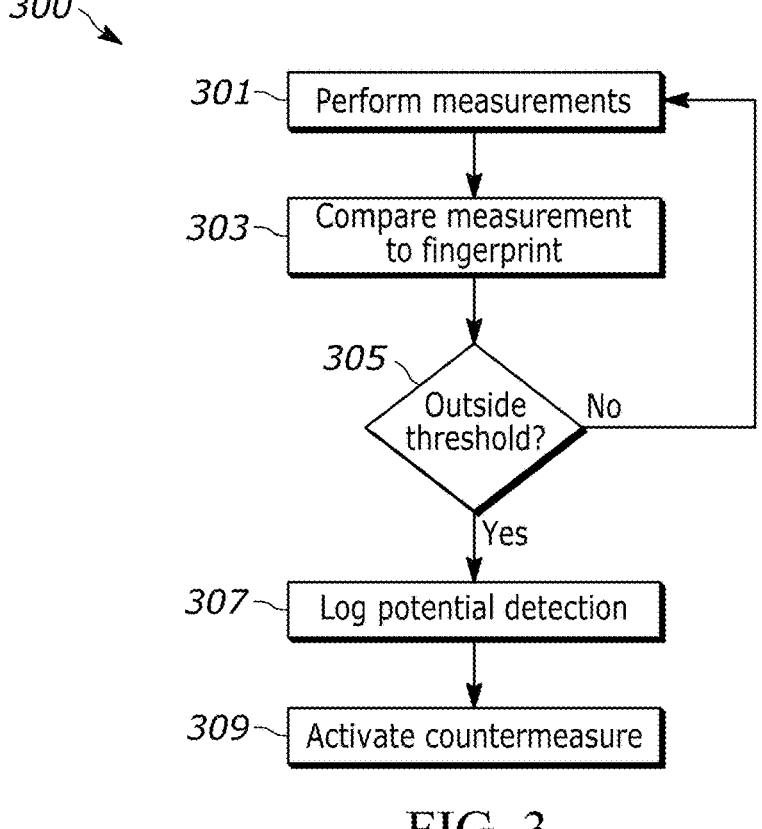
FIG. 3 illustrates a flow chart 300 of run time period of the computing device.

FIG. 3 discloses a flow chart illustrating the run-time period for a system according to an embodiment. At step 301, the system may perform measurements of the system. The measurements may include measurements to any physical attributes of the device. The measurements may be performed at specified intervals. Thus, the measurements may be taken at specified intervals when certain software, processes, or operations are being performed or even halted. The intervals may be at varied time frames or periods as well. The system may compute a run-time fingerprint to compare to the originally derived fingerprint that was constructed. The process to compute the run-time fingerprint may be as that discussed as in FIG. 2, however, utilizing run-time measurements. In one embodiment, it may be crucial for the integrated IDS in the SPDS to separate (e.g., utilizing frequency filtering as described during enrollment process) the different signatures of the devices (or group of devices) before it verifies a certain fingerprint.

At step 303, the system may compare the measurement to the fingerprint. Thus, the system may derive a run-time fingerprint that is utilized to compare to the fingerprint from the enrollment phase. The system may utilize the IDS to compare the measurements to the fingerprint. In another embodiment, the system may send the information to a remote server for verification, rather than verifying on the system or device itself. In another embodiment, the IDS (locally running in the vehicle or remote in a backend), receives the fingerprint from the smart power distribution system and combines the fingerprint information with other information not related to the fingerprint but related to the expected normal operation of the system under surveillance. This expected normal operation can include (but is not limited to) expected values of signals transmitted, expected arrival times or frequency of periodic signals. The IDS then would combine all the information to make a decision as to whether the software has been tampered with or not. The system may perform measurements that can be triggered periodically, using an external trigger, or internally at a start or end of every function that is running on the system. In yet another embodiment, the fingerprint can be combined with fingerprint related information, which may include, for example, an error correcting code derived during the enrolment process. The aim is to correct small deviations in the fingerprint measurement which are due to variations in the measurement set up, normal aging in the electronic components that form part of the ECU, or changes in the environmental conditions that can affect the fingerprint measurement during normal operation. The fingerprint related information, combined with the current fingerprint measurement, will result in "derived" fingerprint(s) that can be used by the IDS to make a decision as to whether there has been an intrusion and if so take an appropriate action. In some embodiments, there may be different error correction information utilized based on the current state of the ECU or the environment under which the ECU is currently operating (for example, different error correction information depending on the temperature under which the ECU currently operates). For example, in one embodiment if there are devices with overlapping frequency ranges, then a group fingerprint could be computed that checks if all devices in the group with overlapping frequency ranges are operating as expected. If at least one of them malfunctions then an adequate countermeasure can be taken.

At step 305 the system may determine if the measurement is outside of a predefined threshold. While the baseline measurement may be performed during enrollment, the system may compare the new measurement to be compared using a distance measure of choice. The distance measure may include Hamming distance, Euclidean distance, Least Squares, etc. Based on the distance result and comparison to a threshold, the system may decide if the software has been tampered with. For example, this may include actual instructions executed and the accompanying order. If the measurement is not outside the threshold, the system may continue to monitor measurements. In an alternative embodiment, the system may utilize classification techniques such as Support Vector Machines (SVMs), k-nearest neighbors algorithm (k-NN), naive Bayer, or (deep) neural networks to make the detection even more accurate.

At step 307, the system may log the potential detection. The IDS or another controller may be utilized in this process. The IDS may log the time and date of the occurrence, associated measurements of the physical attributes of the system or ECU, any software or processes that were running, any remote connections established, etc. The log may also be saved remotely. The log may be used in later processes to help identify countermeasures to any issues that occurred in the process. For example, the log may be later utilized by software developers to help create firewalls or other measures to prevent cyber-attacks. The log might include the derived fingerprint, the raw signal or signals from which the fingerprint was derived, or any other signals that are measured but are not being used for the fingerprint explicitly. The log also may include the time and date of the event (e.g., timestep), the function that was running on the system or ECU, information about the derived fingerprint, or other information about the state of the ECU. Some examples of the state of the ECU may include, for example, counters, programs running at the time, etc. In some embodiments the log might also include a signature to guarantee that the information in the log cannot be modified at a later time but a malicious user or adversary. In an alternative embodiment, the raw measurement may be saved if storage allocation allows it to be saved in memory.

At step 309, the system may activate a countermeasure if it is determined that an anomaly has been detected. The SPDS may control power supply to the ECUs/actuators consumers and can selectively disable them by cutting off power supply. Alternatively, the SPDS may send a signal to the ECUs to initiate a countermeasure within the ECU itself instead of completely turning it off. Last, certain sensors and actuators may be disabled. The system may thus trigger further actions. Such actions may include kill, delay, or modify a process. The system may also send a message our output a notification to a user notifying them of a threat. The notification may be output on a display associated with the system, such as a monitor or mobile phone. In another embodiment, the countermeasure may include modifying code or resetting the system or device to an original code, such as factory code or an original version of code prior to a previous update. In yet another embodiment, the countermeasure may include disabling the ECU. Thus, any updates that may have vulnerabilities are temporarily mitigated. In another embodiment, the system may disable or reboot the device, end a network connection (e.g., disconnect), or reset the device. In yet another embodiment, if the anomalies detected are determined to be actual tampering attacks, the physical measurements received by the verifying entity (e.g., the IDS) may be used to adaptively update the threshold used to device whether software tampering has happened or not. Thus, the threshold may actively change in response to the physical measurements occurring at real time. In another embodiment, a countermeasure can be initiated by triggering an alarm in the car, as well as further measures to mitigate or contain the impact of a detected anomaly. In an alternative embodiment, no countermeasure may be issued and instead an alarm is raised and transmitted to another system (this could be another ECU). That other system (e.g., ECU) may then either take an action (countermeasure) or issue a warning to a user. In one example, a light may be illuminated on a dashboard of a car to notify the driver of an issue so that the driver can decide to take the car to a repair shop, or if it is a critical error, the driver can choose to stop the car. In another embodiment, a notification may be illuminated on display of the vehicle to notify the user of the issue.

Figure 4A:
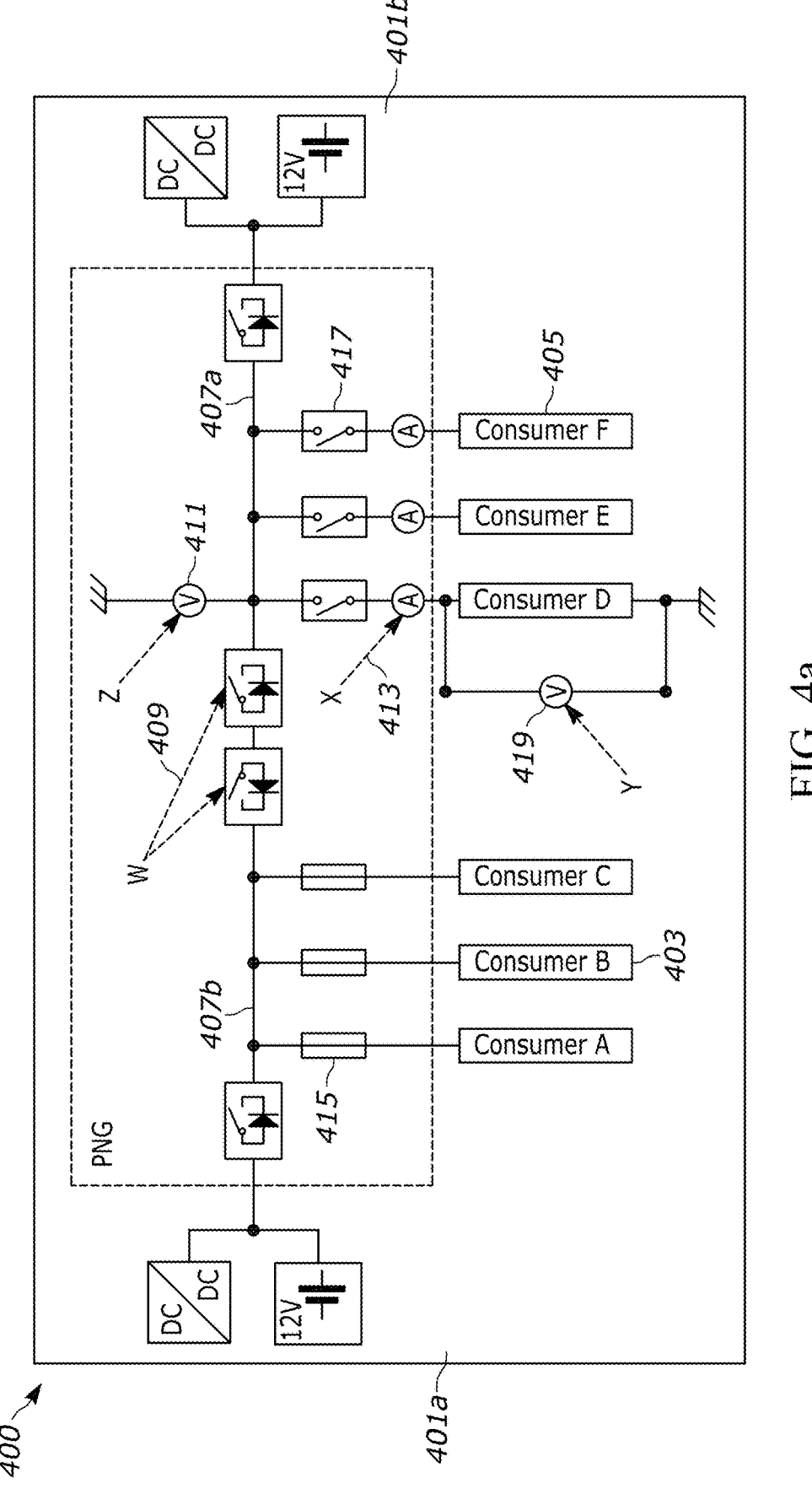
FIG. 4a illustrates a schematic of the smart power distribution system, according to some embodiments of the disclosure.

FIG. 4*a* discloses a schematic illustrating the smart power distribution system according to an embodiment, such as a smart power distribution system. The schematic 400 may include at least two separate groups of consumers 403 and 405. The consumers of one group (e.g. A-C) could be of a lower safety relevance 403 (low Automotive Safety Integrity Level (ASIL) level such as quality management or entertainment), whereas the consumers of another group (e.g. D-F) could be of a higher safety relevance 405 (e.g. ASIL B or higher such as steering and braking). If there is a misbehavior by one of the consumers A-C, then the two groups can be separated using the switches 409 in-between them to prevent the safety relevant consumers from being affected. In this embodiment, consumers A-C are connected with fuses 415 and consumers D-F are connected with switches 417. These additional switches 417 can be used to separate individual consumer channels to prevent other consumer channels from being affected. In another embodiment, it is possible to connect all consumers with switches. Location of consumers can be rearranged in other embodiments.

Each separate group of consumers may be supplied by at least two different power sources 401*a* and 401*b* through their respective power channels 407*a* and 407*b*. These power sources may have their own DC/DC and/or 12 V battery for redundancy. In another embodiment, the power source may be any voltage, such as a 24V, 36V, or 48V. The power source may be dependent on the type of vehicle or vehicle design. In order to provide a fast response, many measurements are taken in real-time, such as current drawn by consumers (measurement X) 413, voltage across the consumers (measurement Y) 419, voltage across the smart power distribution system power channel (measurement Z) 411, temperature of certain components of the smart power distribution system, states of the switches, or power drawn by individual or groups of consumers. The measurements could be taken either directly by a microprocessor, using their Analog-to-Digital Converters (ADCs), or by external devices. Alternatively, external circuitry could be used for pre-processing and filtering of the measurements.

Figure 4B:
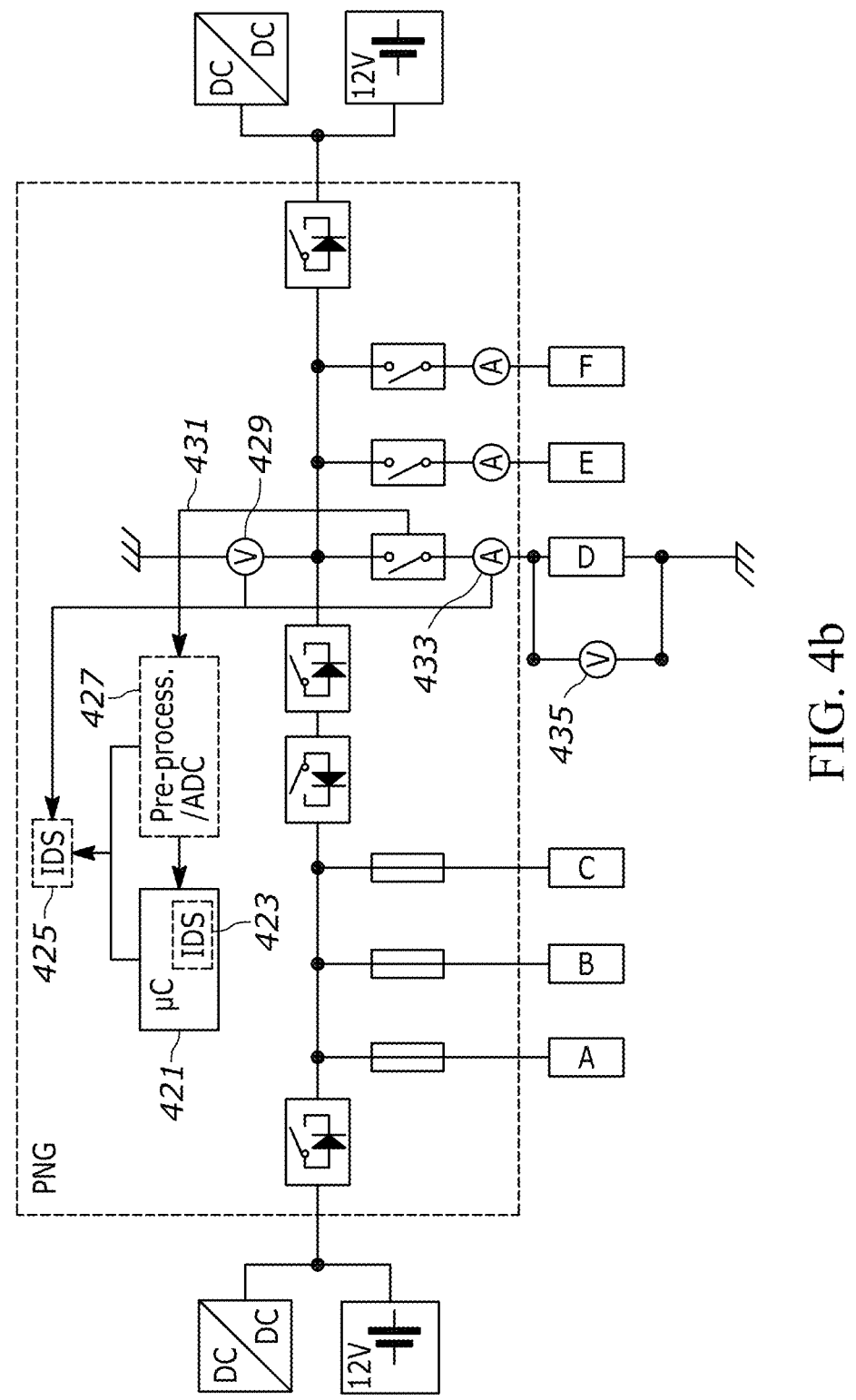
FIG. 4b illustrates a schematic of the smart power distribution system with potential integrations of an intrusion detection system, according to some embodiments of the disclosure.

FIG. 4b discloses a schematic illustrating the smart power distribution system microcontroller and potential integrations of the IDS. In this embodiment, exemplary connections for voltage across the power channel 429, voltage across consumers 435, current drawn by consumers 433, and state-of-switch measurement 431 is shown. These measurements are connected either directly to the smart power distribution system microcontroller 421 or pre-processed by an additional device/circuit 427 beforehand. The system could also detect unsafe behavior or usage of the vehicle by analyzing the impact such behavior has on the power profile of the vehicle. The system could then fingerprint the typical driving behavior of a user and compare the difference in power consumption measured to the fingerprint. This ultimately can detect an unidentified user in the vehicle.

In another embodiment, multiple microcontrollers could be used for additional safety requirements. Additionally, the IDS can be integrated into different locations. For example, in one embodiment the IDS could be directly integrated into the same microcontroller that is used for the smart power distribution system itself 423. In another embodiment, the IDS could be integrated on a separate device. The measurements could then be fed into the IDS either from the smart power distribution system microcontroller 421, from the pre-processing device 427, or directly from the source itself 425. Furthermore, one or more IDS could be implemented for additional redundant security. In one embodiment, the IDS may be implemented in both an integrated system at the smart power distribution system 423 (e.g. Powernet Guardian) and in a different device (e.g., separate hardware components). The system may utilize both of the results of a comparison on the from each IDS system to compare for additional fault-tolerance. For example, if both systems are aligned with their comparison, confidence may be increased as to the status (e.g. normal operation or non-normal operation). Alternatively, you could also perform a first fingerprint verification process on the Powernet Guardian system, which may be more noisy (and may have a larger false-positive rate of detection) and then a second pass in a different ECU with an IDS, which has more resources may implement a more complicated IDS algorithm (which then reduces the false positive rate).

Once the measurements are received, a trained classifier can be used in-field to continuously analyze the measurements and determine whether they are benign or potentially malicious. This detection could be based on a supervised or unsupervised algorithm. For example, a supervised algorithm is a deep neural network with two output neurons: benign and malicious. An unsupervised algorithm could be a Gaussian Mixture Model (GMM). GMM is a probabilistic model used to represent a distribution of data points as a mixture of several Gaussian distributions. It is particularly useful for modeling data that can be grouped into multiple clusters, each represented by a Gaussian distribution with its own mean and variance. A potential intrusion could raise an alarm in the car and further measures to mitigate or contain the impact of the anomaly can be initiated. This could include alerting a central vehicle computer, alerting a driver, activating a limb-home mode of a car, sending an alarm to a remote backend for further analysis, storing the alert and measurements for further analysis locally, or disabling the affected system of the car.

In another embodiment, multiple measurements of the smart power distribution system can be used to realize an IDS. This could increase the performance of the IDS by making use of more available information. Furthermore, the system could use signals and measurements that are not coming from the smart power distribution system itself. This could be, but is not limited to, power measurements from a host-based IDS integrated on a device itself, Controller Area Network (CAN) messages (both generic and specific ones like error codes), and information from outside the vehicle (other vehicles, infrastructure, control center).

In one embodiment, the SPDS may utilize dual power supplies that are both exactly the same, and thus output the same measurements (e.g., power, current, voltage, etc). In such an embodiment, one of the power source networks may include one or more different sensors than the other power source network. Such an embodiment would allow the integrated IDS to check and ensure the consistency of fingerprints (or fingerprint measurements) independently by correlating the different sensors. Such an embodiment may take advantage of the fault tolerant design by explicitly making the power sources not exactly the same. Alternatively, another embodiment may equip the power sources exactly the same (e.g. include the same sensors) and utilize the measurements from these sensors to verify that the fingerprint(s) have not been tampered with given that an attacker would have to tamper with two different connections. This might have an advantage that the system may not need to rely on cryptographic methods, but just the redundancy already built into the system. In the alternative, the cryptographic methods utilize the public key and private key may be utilized in addition to the methods described.

If a detected measurement surpasses a certain threshold, the system will activate a countermeasure to address the potential threat. For example, if a fingerprint is generated for a specific vehicle user and a power profile measurement significantly deviates from this fingerprint, the system may cut power to the vehicle and/or trigger an alarm. Integrating these power supply measurements from the smart power distribution system enhances safety by complementing the measurements from the IDS. Other countermeasures involve using the switches 409 in a smart power distribution system to isolate consumer channels from affected channels. This ensures that certain safety-critical consumer channels remain unaffected by issues in other channels. The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM or flash memory devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algo-rithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system comprising: memory; a processor in a smart power distribution system, wherein the processor is in communication with the memory and programmed to: compute a baseline fingerprint that includes a baseline measurement of a physical attribute of a smart power distribution system during an enrollment period of the system, wherein the enrollment period includes measuring the attribute of the smart power distribution system prior to runtime operation, wherein the smart power distribution system includes at least one set of non-safety critical consumer channels, at least one set of safety critical consumer channels, at least two different power sources connected to at least two power channels, wherein a first power source supplies power to the at least one set of non-safety critical consumer channels and a second power source supplies power to the at least one set of safety critical consumer-channels, and at least two switches separating the safety critical consumer channels and the non-safety critical consumer channels, wherein the at least one set of non-safety critical consumer channels and the at least one set of safety critical consumer channels can be individually shut off and separated from each other by the at least two switches; receive a runtime measurement of the physical attribute of the at least one set of safety critical consumer channels of the smart power distribution system during runtime; compute a runtime fingerprint utilizing the runtime measurement and compare the runtime fingerprint to the baseline fingerprint; and in response to the runtime measurement exceeding a threshold, execute a countermeasure operation against software in communication with the smart power distribution system.

2. The system of claim 1, wherein the runtime measurement can be received from the at least one set of non-safety critical consumer channels of the smart power distribution system during runtime.

3. The system of claim 1, wherein the at least one set of non-safety critical consumer channels and the at least one set of safety critical consumer channels can be coupled.

4. The system of claim 1, wherein the physical attribute includes a current drawn by the at least one set of non-safety critical consumer channels.

5. The system of claim 1, wherein the runtime measurement is obtained at a first sensor located at a first power source and a second sensor located at a second power source.

6. The system of claim 5, wherein the first sensor and second sensor are exactly the same.

7. The system of claim 5, wherein the first and second sensor are different types of sensors.

8. The system of claim 5, wherein the processor is further programmed to compare runtime measurements obtained at both the first sensor and the second sensor.

9. The system of claim 1, wherein the physical attribute includes a power drawn by the at least one set of safety critical consumer channels.

10. The system of claim 1, wherein the runtime measurement is configured to be drawn by an external device when configured with the smart power distribution system.

11. The system of claim 1, wherein the memory is configured to store the fingerprint.

12. The system of claim 1, wherein the processor is further programmed to, in response to the measurement exceeding a threshold, log the measurement and store the log in memory.

13. The system of claim 1, wherein the processor is further programmed to define a fingerprint of a user's behavior.

14. A system comprising: memory; a processor in a smart power distribution, wherein the processor is in communication with the memory and programmed to: compute a baseline fingerprint that includes a baseline measurement of a physical attribute of the smart power distribution system during an enrollment period of the system, wherein the enrollment period includes measuring the attribute of the smart power distribution system prior to runtime operation, wherein the smart power distribution system includes at least one set of non-safety critical consumer channels, at least one set of safety critical consumer channels, at least two different power sources connected to at least two power channels, wherein a first power source supplies power to the at least one set of non-safety critical consumer channels and a second power source supplies power to the at least one set of safety critical consumer-channels, and at least two switches separating the safety critical consumer channels and the non-safety critical consumer channels, wherein the at least one set of non-safety critical consumer channels and the at least one set of safety critical consumer channels can be individually shut off by the at least two switches; receive a runtime measurement of the physical attribute of the at least one set of non-safety critical consumer channels of the smart power distribution system during runtime; compute a runtime fingerprint utilizing the runtime measurement and compare the runtime fingerprint to the baseline fingerprint; and in response to the runtime measurement exceeding a threshold, execute a countermeasure operation against software in communication with the smart power distribution system.

15. The system of claim 14, wherein the runtime measurement can be received from the at least one set of safety critical consumer channels of the smart power distribution system during runtime.

16. A system comprising: memory; a processor of a smart power distribution system, wherein the processor is in communication with the memory and programmed to: compute a baseline fingerprint that includes a baseline measurement of a physical attribute of the smart power distribution system during an enrollment period of the system, wherein the enrollment period includes measuring the attribute of the smart power distribution system prior to runtime operation; wherein the smart power distribution system includes at least one set of non-safety critical consumer channels at least one set of safety critical consumer channels, at least two different power sources connected to at least two power channels, wherein a first power source supplies power to the at least one set of non-safety critical consumer channels and a second power source supplies power to the at least one set of safety critical consumer-channels, and at least two switches separating the safety critical consumer channels and the non-safety critical consumer channels, wherein the at least one set of non-safety critical consumer channels and the at least one set of safety critical consumer channels can be individually shut off by the at least two switches; receive a runtime measurement of the physical attribute of the at least one set of non-safety critical consumer channels and the at least one set of safety critical consumer channels of the smart power distribution system during runtime; compute a runtime fingerprint utilizing the runtime measurement and compare the runtime fingerprint to the baseline fingerprint; and in response to the runtime measurement exceeding a threshold, execute a countermeasure operation against software in communication with the smart power distribution system.

17. The system of claim 16, wherein the countermeasure operation includes disabling the software in communication with the smart power distribution system.

18. The system of claim 16, wherein the runtime measurement is received from a sensor located at the smart power distribution system.

19. The system of claim 16, wherein the runtime measurement is received at one of the at least two switches.

20. The system of claim 16, wherein smart power distribution system is a Powernet Guardian system.

\* \* \* \* \*